US006935995B2

(12) United States Patent
Siebert et al.

(10) Patent No.: US 6,935,995 B2
(45) Date of Patent: Aug. 30, 2005

(54) ROLLER FOR FLUID FILM PREPARATION OR APPLICATION

(75) Inventors: Achim Siebert, Melle (DE); Thomas Rosemann, Belm (DE)

(73) Assignee: Westland Gummiwerke GmbH & Co., Melle-Westerhausen (DE)

( * ) Notice: Subject to any disclaimer, the term of this patent is extended or adjusted under 35 U.S.C. 154(b) by 0 days.

(21) Appl. No.: 10/173,272

(22) Filed: Jun. 17, 2002

(65) Prior Publication Data

US 2003/0078147 A1 Apr. 24, 2003

(30) Foreign Application Priority Data

Jun. 16, 2001 (DE) ........................................ 101 29 107

(51) Int. Cl.$^{7}$ ................................................ F16C 13/00
(52) U.S. Cl. ......................... 492/56; 492/53; 29/895.32
(58) Field of Search ............................. 492/56, 53, 50, 492/59; 29/895.32

(56) References Cited

U.S. PATENT DOCUMENTS

| | | | | |
|---|---|---|---|---|
| 3,139,826 A | * | 7/1964 | Rainwater | 101/348 |
| 3,686,731 A | * | 8/1972 | Koori et al. | 492/56 |
| 4,043,013 A | | 8/1977 | Zeppernick et al. | 29/132 |
| 5,257,967 A | | 11/1993 | Gysin | 492/56 |
| 5,797,071 A | * | 8/1998 | Ozawa et al. | 399/159 |
| 5,849,399 A | * | 12/1998 | Law et al. | 428/212 |
| 6,620,476 B2 | * | 9/2003 | Tarnawskyj et al. | 428/36.8 |
| 6,660,351 B2 | * | 12/2003 | Chen et al. | 428/36.91 |
| 2002/0165075 A1 | * | 11/2002 | Shea et al. | 492/56 |

FOREIGN PATENT DOCUMENTS

| | | | |
|---|---|---|---|
| DE | 24 33 749 | 1/1976 | B41F/31/26 |

* cited by examiner

*Primary Examiner*—Marc Jimenez
(74) *Attorney, Agent, or Firm*—Grossman Tucker Perreault & Pfleger, PLLC

(57) ABSTRACT

The invention relates to a roller for fluid film preparation, such as for offset printing, having an inside core, a first layer which surrounds the core and has a first hardness, and a second layer which surrounds first layer A and has a second hardness different from that of the first layer. The roller coating, including the first and second layers, is provided, at least in certain sections, with an essentially continuous hardness gradient through the layer thickness. The hardness gradient can be produced by incorporating a gradient of a hardness-modifying substance or agent, or a precursor thereof, e.g. an agent that increases the degree of cross-linking, by means of diffusion or migration of the substance or agent from at least one surface of the roller coating.

19 Claims, 2 Drawing Sheets

FIG. 1
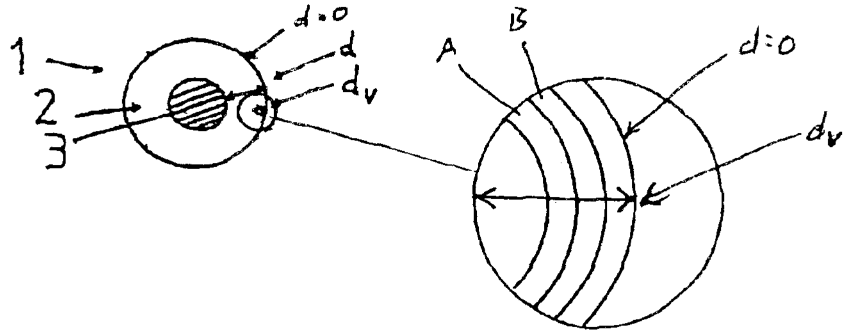
FIG. 1a
FIG. 2
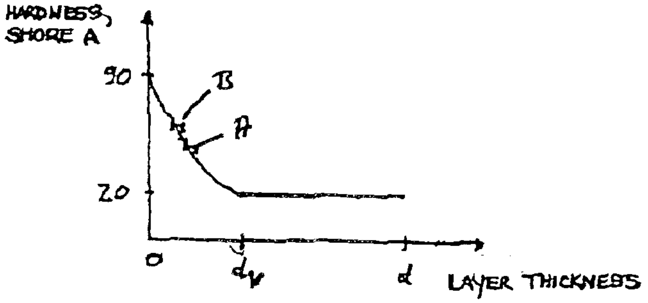
FIG. 3
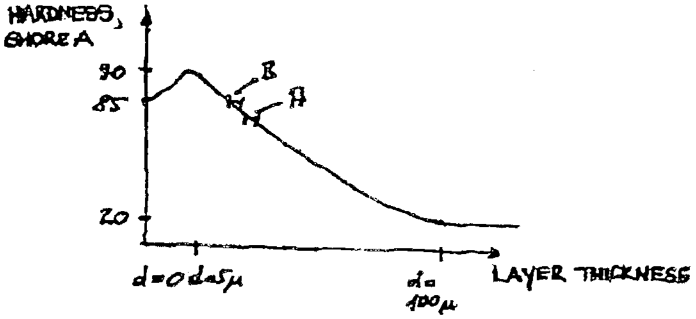

FIG. 4
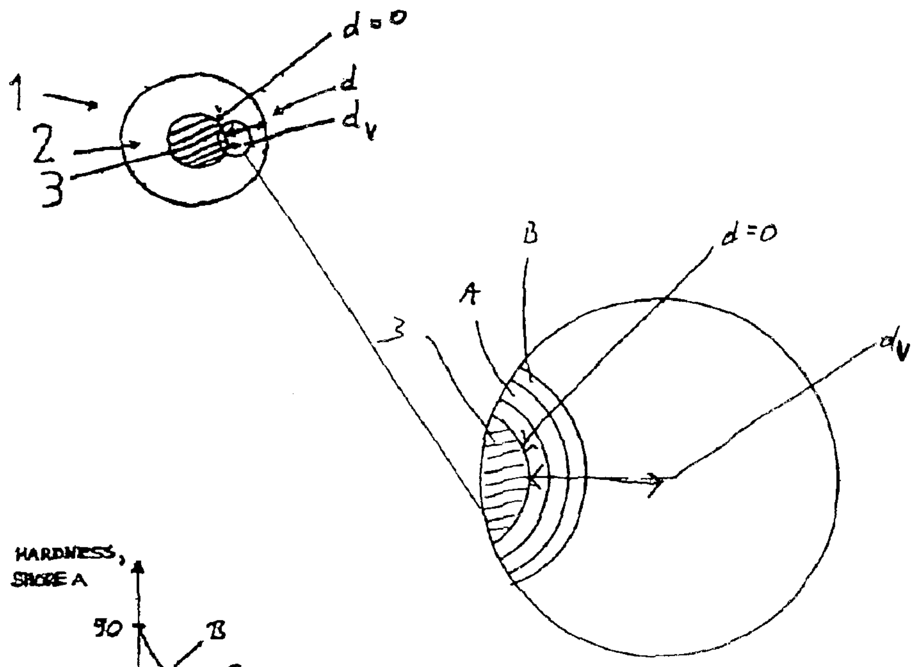
FIG. 4a
FIG. 5
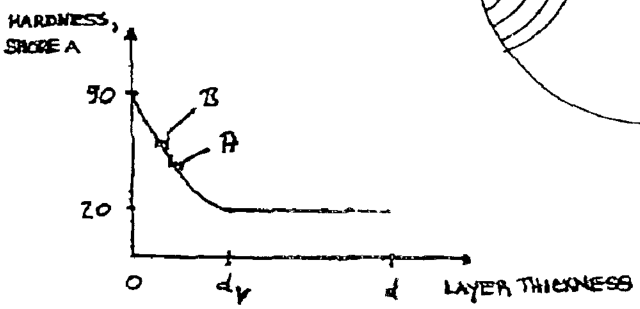
FIG. 6
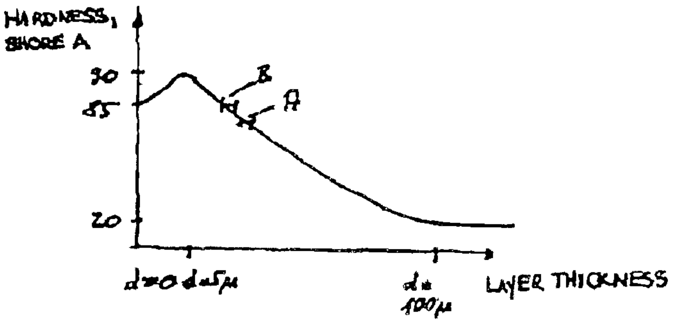

ROLLER FOR FLUID FILM PREPARATION OR APPLICATION

TECHNICAL FIELD

The invention relates to a roller for fluid film preparation or application having a roller coating of layer thickness d, comprising a first layer, which surrounds the core and has a first hardness, and a second layer, which immediately surrounds the first layer and has a second hardness different from that of the first layer.

PRIOR ART

A generic roller for ink application is known from DE-OS 24 33 749, for example. The design with at least two layers makes it possible to adjust the chemical nature of the roller surface, which determines the affinity for a printing medium, for example, as well as other properties of the roller, such as adhesion of the outer layer on the essentially rigid roller core, or the mechanical properties of the roller coating, such as its hardness.

An inking roller with a core is further known from U.S. Pat. No. 5,257,967, on which two layers of elastomer materials of different hardness are bonded. This is intended to achieve more uniform ink application.

Although inking rollers of this kind have been known for a long time, the problem often occurs that printing presses that transfer fluid films by means of elastomer-coated rollers cause inhomogeneities in ink application on the respective printed product. In offset printing processes in particular, the formation of undesirable micro-streaks is known as "ribbing". These ribs often occur at intervals of several millimeters and are visible both on the printed product and on the inking rollers. This undesirable ribbing is promoted by the use of large quantities of damping solution and ink, or high printing agent throughput rates. It is assumed that the ribs are caused by an inadequate metering function of the rollers of the inking unit. Accordingly, an attempt was made with a certain degree of success to prevent ribbing by means of traversing motion of the inking rollers relative to one another, this resulting in lateral distribution of the printing medium. However, traversing inking rollers of this kind require correspondingly equipped fluid film preparation machines, which thus become complex in design and expensive. Changing the quantity of printing agent and damping solution used is frequently not an option for preventing ribbing, because the quantities of these media used must be adapted to other parameters.

DESCRIPTION OF THE INVENTION

The object of the invention is to design a roller for fluid film preparation or application, particularly for offset printing, with which inhomogeneities in the printing medium or printed product, particularly ribbing on the printed product, can be at least largely avoided, which can be adapted particularly easily to the respective requirements by changing the characteristics of the coating surfaces, and which is cost-efficient to manufacture.

According to the invention, the object is solved by a roller for fluid film preparation or application, in which the roller coating at least in certain areas displays an essentially continuous hardness gradient that can exist through part of layer thickness d of the roller coating. It has been found that the presence of an essentially continuous hardness gradient, i.e. a continuous change in hardness, has a very positive influence on the printed result, particularly with regard to the occurrence of ribbing, and that ribbing can be avoided almost entirely by using rollers according to the invention. In particular, through the design of the roller according to the invention, the ratio of transverse and tangential forces or stresses to the compressive forces in the region of the roller surface can be specifically adjusted, particularly increased, which is essential for the quality and efficiency of fluid film preparation. Consequently, the coating material is preferably resistant to printing media.

An essentially continuous hardness gradient is defined as one in which relatively sharp jumps in the hardness curve are avoided, such as those that occur at the phase boundaries of adjacent layers of different hardness, which may be bonded together by a connecting layer, such as an adhesive layer. The hardness gradient of the roller according to the invention can be essentially linear or essentially exponential, for example. However, other suitable hardness gradients can also be set, which can also display interim maxima or plateaus with essentially constant hardness through a region of the layer thickness curve.

The layers of different hardness of the roller according to the invention are preferably made of the same base material, or largely identical in composition. The layers preferably only differ in terms of the proportion of hardness-modifying substance, or a precursor thereof, or in terms of a property that correlates with the amount of an incorporated hardness-modifying substance or medium, such as the degree of cross-linking. In order to set a gradient for the degree of cross-linking, for example, a heat or radiation intensity gradient, or an activator or photoinitiator gradient can be produced. Because the layers of different hardness have the same basic component or an essentially identical composition, the roller coatings can also be of particularly simple design and bond defects or adhesion problems between layers of different composition largely avoided.

The material forming the layer of low hardness, which can particularly represent the basic coating material of the roller coating applied to the core, preferably has a hardness of less than 35 Shore A, e.g. less than 30 Shore A, preferably in the range from 25 to 10 Shore A, particularly preferably in the range from 25 to 20 Shore A, without being limited to this.

The roller coating is preferably such that, in the region of changing hardness, the difference in the intrinsic hardness of the coating material through a layer thickness increment of 10 micrometers is in the range of a maximum of 5 Shore A, particularly 2 to 3 Shore A (hardness gradient 80 Shore A through layer thickness 0.5 mm: 1.6 Shore A through 10 micrometers) to 0.02 to 0.04 Shore A (hardness gradient 35 Shore A through 2 mm: 0.07 Shore A through 10 micrometers), preferably in the range of 1 to 0.1 Shore A, particularly preferably in the range of less than 0.2 to 0.8 Shore A, particularly in the region of 0.4 Shore A. These hardness gradients are preferably maintained essentially through the entire coating thickness of the roller that displays a hardness gradient. The hardness gradients specified above can be estimated by micro-hardness tests or by removal of the roller coating, e.g. by continuously grinding off the roller coating in wedge-shaped fashion and determining the overall hardness of the remaining roller coating, this making it possible to derive the intrinsic hardness of one layer thickness increment.

The hardness gradient of the rollers according to the invention can be characterised by the hardness measured on the surface as a function of the layer thickness of the layer displaying a hardness gradient. In this context, the layer thickness can be varied by means of incremental layer thickness removal, for example by continuously grinding down the hardness-modified coating in the form of a wedge. A profile of effective hardness can be determined by grinding down the hardness-modified roller coating in consecutive layers, e.g. in increments of 50 to 500 micrometers, e.g. in the region of 200 micrometers. The hardness can be measured using common hardness testing methods, such as IRHD (DIN 53 519 Part 1), IRHD-soft (DIN 53 519 page 1), IRHD-micro (DIN 53 515 Part 2), Shore A hardness (DIN 53 505) or Shore D hardness (DIN 53 505). It should be pointed out here that, because of the continuous hardness gradient, measuring the hardness of the roller according to the invention does not represent a standard hardness measurement as per the DIN standards specified above and only provides an effective (mean) hardness. However, a hardness measurement of this kind can sufficiently characterise the hardness gradient of a roller according to the invention and be used for purposes of comparison, particularly when the hardness is measured by two or more different test methods, such as determination of the IRHD-micro hardness and the Shore A hardness. Characterisation of the hardness gradient by the method described above is particularly possible when the hardness gradient of the roller according to the invention only extends through part of the layer thickness of the roller coating and the roller coating is removed in the entire hardness-modified region down to the base material of the roller coating, whose hardness has not been modified.

At a layer thickness increment of 10 micrometers, i.e. in a hardness test with a given roller layer thickness and based on coating removal of 10 micrometers (actual removal or calculated reference value, where the hardness gradient should then be essentially linear), the effective hardness gradient determined by the method described above is preferably a hardness difference of 1 to 0.02 Shore A, preferably 0.5 to 0.05 Shore A, particularly preferably 0.2 to 0.1 Shore A, particularly about 0.015 Shore A. Of course, determining the hardness of larger layer thickness increments results in proportionally greater hardness differences. For example, rollers according to the invention preferably display hardness differences of 10 to 0.2 Shore A, particularly preferably 5 to 0.5 Shore A, particularly in the range of 1 to 2 Shore A, through a layer thickness of 100 micrometers (corresponding to layer thickness removal of 100 micrometers).

Rollers according to the invention can have essentially continuous hardness gradients, or changes in hardness, over the difference in intrinsic hardness—where the hardness difference can result from the hardness difference between the hardness-modified roller surface and the unmodified base material—of greater than/equal to 5 Shore A. The hardness difference can easily be greater than 100 Shore A, such as up to 50 Shore D or more. In particular, the hardness differences can be roughly 10 to roughly 90 Shore A, such as roughly 30 to roughly 50 Shore A. Those from 50 to 70 Shore A are particularly suitable for specific applications. The entire layer thickness with changing hardness preferably has an essentially continuous hardness gradient.

Taking into account the effective hardness defined above, which results from the determination of the respective hardness of the roller coating at a given point on the depth profile without considering the hardness gradient present, rollers according to the invention preferably have an essentially continuous effective hardness gradient over a hardness difference of greater than/equal to 5 Shore A, such as 10 to 50 Shore A, preferably less than 40 Shore A and less than 80 IRHD-micro, particularly preferably between 10 and 20

Shore A and 20 to 50 IRHD-micro, where greater or smaller hardnesses can be set for specific applications. The hardness difference can, in particular, correspond to the rise in the surface hardness of the roller compared to the hardness of the unmodified base material. It should again be emphasised here that the above specifications for Shore A hardness and IRHD-micro hardness are not values that have been converted back and forth, because both measuring methods, which were not conducted in accordance with standards, are associated with different, inherent errors, due to the hardness gradient of the coating. Nevertheless, these values permit characterisation of the roller coating according to the invention.

In order to also absorb peak stresses during dynamic deformation of the surface layer of the roller coating, and to provide a roller with a sufficient service life, the second, outside layer of the roller coating preferably has a higher hardness than the first, inside layer adjacent to the roller core, meaning that the hardness decreases in the radial direction from the outside in. For this purpose, the second layer can have a higher degree of cross-linking than the first layer. The hardest layer of the coating section with an essentially continuous hardness gradient, which can have the highest degree of cross-linking of the roller coating, is preferably the outermost layer of the coating in the radial direction, meaning that the hardness gradient extends inwards from the outermost roller surface into the roller material, and the hardness decreases continuously from the outside in. However, an outer cover layer (see below) can also be provided if necessary.

The hardest layer of the coating section with an essentially continuous hardness gradient is preferably also the hardest layer in the depth profile of the roller coating, where the hardness of the layers still has an influence on the surface hardness of the roller coating, which can be determined by means of the wedge-shaped layer removal method described above or some other suitable method. The hardest layer of the coating section with an essentially continuous hardness gradient is preferably also the hardest layer facing the inner and/or outer roller coating surface, or the outside roller surface. The "hardest" layer of the hardness gradient is preferably the hardest layer referred to a layer thickness depth of the roller coating of up to 0.1 mm, up to 0.5 mm, up to 1 mm, up to 2 mm or up to 5 mm of the roller coating starting from the coating surface, e.g. the roller surface, possibly also down to a depth of up to 10 mm or up to 30 mm of the roller coating, without being limited to this. The term "hardest layer" thus preferably refers to the layers of the roller coating close to the surface. If required for specific applications, for example, an elastomer layer of high hardness can thus be provided next to the roller core, which, with the given roller coating, has no or only insignificant influence of the surface hardness of the roller coating, without departing from the concept of the invention, where, however, the inside layers will usually be of a basic coating material with unmodified hardness. The hardest layer of the coating section with an essentially continuous hardness gradient can thus also be the hardest layer of the roller coating, particularly referred to the intrinsic hardness, possibly excluding the connection area between the coating and the core.

The hardest layer of the roller coating section with an essentially continuous hardness gradient, particularly in the layer thickness range of up to 0.1 mm or up to 30 mm starting from the roller surface, as defined in the above paragraph, can be a distance of roughly 100 or 50 micrometers or less, particularly roughly 20 micrometers or less, roughly 10 micrometers or less, preferably roughly 5 micrometers or less, or roughly 1 micrometer or less, away from the inner and/or outer roller coating surface. In this context, the inner roller coating surface faces the roller core, while the outer coating surface is also the roller surface. This layer can also display the highest degree of cross-linking in the layer thickness increment in question. Starting from this layer, the hardness profile can be essentially constant up to the roller surface, or decline from the maximum hardness towards the surface, in which case the decline can preferably be less than 20%, less than 10%, or preferably less than 5%, referred in each case to the absolute (intrinsic) hardness of the hardest layer (e.g. the Shore A hardness) of the coating section near the surface, respectively referred to the effective hardness or respectively referred to the hardness increase compared to the base roller material with unmodified hardness, without being limited to this. A decrease in coating hardness towards the roller surface can be due, for example, to the method of hardness modification, e.g. if a hardness-modifying cross-linking agent enters into secondary reactions on the roller surface that cause a slighter hardness change or none at all, or if substances, such as plasticisers, are applied to modify the surface.

The change in hardness in the region of the continuous hardness gradient is preferably associated with a corresponding change in the degree of cross-linking. A second layer of greater hardness preferably has a higher degree of cross-linking than the first, inside layer. The outermost, hardest layer preferably has the highest degree of cross-linking. The hardest or most highly cross-linked incremental layer in the region of the roller surface preferably has a residual elongation at break of at least 50%, preferably at least 70%. The softest layer of a hardness gradient preferably has the lowest degree of cross-linking.

As an essentially linear decrease or increase in hardness, the hardness gradient can extend essentially continuously through a radial layer thickness of more than 0.01 mm, more than 0.05 mm or more than 0.1 mm to 30 mm or more. The hardness-modified area can particularly have layer thicknesses in the range of 0.2 or 0.3 to 10 mm, such as in the range of 0.5 mm or 1 to 2 or up to 5 mm. The hardness-modified area can be followed in the radial direction by another hardness-modified area, possibly separated by an intermediate layer, or by unmodified base material of the roller coating.

The hardness gradients, differences and ranges specified above are particularly between two maximum and minimum values and/or plateaus in the hardness curve and extend through the layer thickness.

In a preferred method, regardless of the way in which the hardness gradient is produced, the process step that produces the hardness gradient is interrupted before a change in hardness occurs through the entire layer thickness of the roller material or the roller coating. Layers of the roller coating at a distance from the outer roller surface can thus consist of unmodified base material. The change in hardness can essentially occur only on the surface, or extend through a fairly large coating depth.

The method is preferably implemented such that the roller coating is subjected to only a superficial hardness change, i.e. the layer thickness of the hardness-modified section is less than the layer thickness of the unmodified base material. The ratio of the layer thickness of the coating material with virtually constant hardness through the layer thickness to the layer thickness of the section with the essentially continuous hardness gradient can be in the range of 2:1 to 30:1 or more, without being limited to this, preferably in the region of 4:1 or more, particularly preferably in the range of 6:1 to 15:1. The total layer thickness of the elastomeric roller coating can be in the range of 4 to 20 mm, without be limited to this, preferably in the range of 6 to 13 mm. The sections with constant hardness and with a hardness gradient are preferably directly adjacent to one another in the radial direction.

The setting of continuous hardness gradients according to the invention is particularly advantageous with roller coatings made of elastomeric base materials, specifically with cross-linkable elastomeric base materials, where the base materials can display thermoplastic properties, but particularly also only partially thermoplastic or non-thermoplastic properties. For example, the basic components can consist of synthetic or natural rubber (NR), halogenated rubber, such as polychloroprene, polyurethane, butadiene rubber (BR), nitrile-butadiene rubber (NBR), partially or fully hydrogenated nitrile-butadiene rubber (HNBR), ethylene acrylate rubber (EAM), chlorosulfonated polyethylene rubber (CSM), styrene-butadiene rubber (SBR), ethylene-propylene rubber (EPDM), PVC, fluorinated rubber (FPM), silicone rubber (Q) or ethylene-vinyl acetate copolymer, or display several of these components. However, other suitable base materials that display the targeted chemical and mechanical properties can also be used as the base material.

The hardness gradient is preferably produced by a gradient of a component of the roller coating that differs from the basic component. In particular, one or more hardness-modifying agents from the group of hardeners, cross-linking agents, activators, photoinitiators and plasticisers, or other low-molecular compounds or precursors of the specified components, can be used that produce a hardness gradient in the roller coating. In this context, the hardness-modifying substances can produce a hardness gradient due to their intrinsic properties, or after suitable conversion or reaction with another substance. Specifically, one or more of the above-mentioned hardness-modifying agents can be used, which can produce a gradient in the degree of cross-linking of a coating component, particularly the basic component, where the corresponding cross-linking reaction is permitted to take place to a sufficient extent by means of appropriate process conditions. For this purpose, the specified substances, for example, can be incorporated in the coating material with a gradient, or a gradient of the substances produced in some other way, where suitable conversion of the agents is subsequently initiated if necessary. As a result, rollers with a hardness gradient through at least part of the roller layer thickness can be manufactured by simple means.

Production of the hardness gradient is not limited to the substances specified above. An essentially continuous hardness gradient can also be produced, for example, if adjacent layers have different basic components and at least one of the basic components displays a gradient. Additionally or alternatively, the monomer or oligomer content of a polymeric material, such as a material of which the elastically deformable outer region of the roller is at least partially made, can vary through the layer thickness, for example. The monomers or oligomers can be those of the polymers mentioned above for manufacturing the roller coating, without being limited to this. If necessary, other suitable, low-molecular substances can be used for this purpose. If necessary, the hardness gradient can be produced alternatively or additionally by components such as fillers, or by other suitable substances that are compatible with the roller material and preferably enable the generation of a permanent hardness gradient.

Of course, the above measures for setting a hardness gradient can also be applied in combination. For example, both the plasticiser content and the cross-linking agent content can display gradients, or several compounds in a group, such as several cross-linking agents and/or several fillers, can be used that each have different gradients, meaning that more complex hardness gradients can also be set through the roller layer thickness.

Of course, in order to form hardness gradients according to the invention, other media that influence hardness, such as heat and/or radiation, can be caused to interact with the roller coating such that an essentially continuous hardness gradient results, e.g. by activating cross-linking agents, producing suitable activators, or the like. Radiation can mean light or particle radiation, such as electron beams or other suitable radiation. Heat and/or suitable radiation can also be caused to interact with the roller coating in pulsed fashion in order to trigger hardness-modifying processes within the roller coating, e.g. to change the degree of cross-linking of the elastomer component. In this context, the substance activated or converted by heat and/or radiation can then also be present in a more homogeneous distribution.

Advantageously, a hardness-modifying substance and/or a precursor thereof is incorporated by means of diffusion or migration of the substance from the outside into the roller material, e.g. the coating material of a roller coating applied to a core, where the hardness-modifying substance indirectly or directly generates a hardness gradient, e.g. by subsequent reactions with components in the roller coating.

The hardness-modifying substance preferably displays a sufficiently low diffusion coefficient under standard roller operating conditions, meaning that the hardness gradient remains essentially constant in terms of time and location throughout the service life of the roller. After being incorporated into the roller material, the hardness-modifying substance can be immobilised, e.g. by subsequent chemical reactions or temporary promotion of penetration into the roller material, e.g. by elevating the temperature during generation of the hardness gradient to more than it would be under standard operating conditions, or by the presence of a suitable solvent for the substance being diffused into the material, where the solvent preferably differs from the solvents used when operating the roller, e.g. those contained in printing media. For example, the diffusion of a cross-linking agent, such as a peroxide, into the material can be promoted by acetone.

Surface hardening can be carried out, for example, by incorporating cross-linking agents, such as substances containing halogens and/or sulphur, in roller coatings containing rubber compounds. The cross-linking agents can be incorporated into the coating material by means of solutions or via the gas phase. For example, a roller coating containing a rubber material can be surface-hardened by incorporating sulphur chloride or other sulphur halides or polysulphur halides via toluene solution, or by gas-phase chlorination. It is also possible, for example, to rub in sulphur or sulphur compounds and/or vulcanisation accelerators in the solid phase, such as in the form of powders. It is particularly advantageous to diffuse radically reacting monomers, peroxides and/or photoinitiators, or precursors of these compound classes, into the coating material through the surface. The process steps described above can be carried out during, before and/or after a further process step associated with the first step, such as the application of heat and/or radiation to the coating material in order to bring about corresponding cross-linking of the coating material, for example.

The gradient of the hardness-modifying substance can also be produced by essentially continuously changing the composition of the coating material to be applied to a core, for example by essentially continuously or quasi-continuously changing the composition of the coating material by dip or spray coating.

The change in hardness of the roller coating can be brought about by changing the hardness of the coated roller, where an elastomeric roller coating is applied to an essentially rigid core. In this context, the roller coating is preferably made of a homogeneous material. The coating can be bonded to the core by an adhesive layer. Additionally or alternatively, a hardness gradient can be incorporated into the roller coating, if necessary, in an upstream process step, after which the roller coating is then applied to the core. If necessary, the two process steps described above can be followed by further build-up of the roller coating, possibly by means of process steps that modify the hardness or produce hardness gradients.

If necessary, the hardness-modified section can be provided with one or more additional cover layers that determine the affinity of the roller surface for the processed medium, such as a printing medium, e.g. in the form of hydrophilic or oleophilic components, such as plasticisers, or that have desirable chemical or physical properties, such as reducing wear. The cover layer can comprise just one or several molecular layers and have a thickness in the range of 10 to 1 or less micrometers, without being limited to this. If a top cover layer is present—which can also be dispensed with as needed and which is preferably small compared to the layer thickness of the roller coating displaying a radial hardness gradient—it preferably does not affect the resulting overall hardness of the roller surface at all or only insignificantly.

If necessary for specific applications, intermediate layers can be provided between layers with essentially continuous hardness gradients. These intermediate layers can act as diffusion barriers against hardness-modifying substances or media incorporated in the coating material, or they can have no or only a minor effect in this regard.

The surface-modifying substances mentioned above are preferably immobilised simultaneously on the roller surface by the hardness-modifying substance, for example by chemical bonding, particularly by radical cross-linking, with the elastomeric coating material. To this end, the surface-modifying substance, e.g. a surfactant or emulsifier, can be applied to the roller coating and bonded to it immediately before or after, preferably together with the hardness-modifying substance, e.g. a cross-linking agent such as a peroxide. The surface-modifying substance can be present in parts by weight of more than 5%, preferably more than 10 to 25%, particularly preferably roughly 50% referred to the solvent-free mixture containing the hardness-modifying and surface-modifying substance, possibly in addition to other components. Fatty alcohol derivatives, e.g. fatty alcohol polyglycol ether, have proven to be particularly suitable as plasticisers. The treatment conditions of the roller are preferably selected such that both the hardness-modifying substance and the surface-modifying substance react with the elastomeric coating material.

The hardness gradient is preferably produced after vulcanisation of the elastomeric roller coating, after any surface-treatment and/or after dimensioning of the roller layer displaying a hardness gradient, e.g. by means of layer removal, such as grinding or other suitable calibration measures. The hardness gradient is preferably generated in a roller that is otherwise ready for use. The process steps can also be carried out in a different order if necessary. The inside surface layer of the roller coating can be produced, for example, in a prefabricated roller coating, where the coating modified in accordance with the invention is subsequently applied to the roller core, e.g. by being expanded and slipped onto the core.

The roller core can be made of an essentially rigid material, such as steel or some other suitable material.

The roller coating with the essentially continuous hardness gradient preferably extends over the entire circumference and over the entire length of the fluid-film-preparing area of the roller. If appropriate, the section of the roller coating with a hardness gradient can extend in sections over only part of the roller surface, i.e. a segment of the length and/or the circumference of the roller, e.g. only over specific segments of the roller surface, the remaining surface areas of the roller not displaying a hardness gradient. For example, a roller segment with a hardness gradient can be provided only in the middle of the roller and extend in the centre of the roller, for example, over 50% or 75% of the roller length and over the entire circumference. Also, for example, a narrow edge strip of the roller coating can be provided next to the ends of the roller, which has no hardness gradient and can have a width of 10%, 5% or less of the roller length, for example. The specified segments can extend over all or part of the circumference of the roller. The roller surface can also have areas or segments with different hardness gradients. For example, the edge strips next to the roller ends can have a higher or lower hardness gradient than the middle region of the roller, this being achieved, for example, by incorporating different quantities of hardness-modifying substances, e.g. cross-linking agents, into the roller coating. The segments with different hardnesses, or with unmodified hardness compared to the base material, can, for example, also be produced by covering the roller surface with a material, such as a film or wax, and then applying the hardness-modifying substance, e.g. a peroxide, to the roller surface, or by some other suitable means.

The roller according to the invention can generally be used for fluid film preparation, particularly for ink film preparation and/or for the preparation of damping solution films, without being limited to this. Ink and damping solution films of this kind are used in printing units, for example. However, the rollers according to the invention can also be put to advantageous use to prepare fluid films in other fields of application. The rollers according to the invention can be used in machines in which they work against other rollers and exchange radial or tangential pressure forces with them.

BRIEF DESCRIPTION OF THE DRAWINGS

An example of the invention is illustrated below and described on the basis of two preferred embodiments. The figures show the following:

FIG. 1*a* is an enlarged view of a portion of the roller illustrated in FIG. 1, FIG. 2 A schematic diagram of the hardness curve of the roller in FIG. 1, FIG. 3 A schematic diagram of the hardness curve of the roller in FIG. 1 according to an alternative embodiment, FIG. 4*a* is an enlarged view of a portion of the roller illustrated in FIG. 4, FIG. 5 A schematic diagram of the hardness curve of the roller in FIG. 4, FIG. 6 A schematic diagram of the hardness curve of the roller in FIG. 4 according to an alternative embodiment.

DESCRIPTION OF THE PREFERRED EMBODIMENTS

FIG. 1 shows a roller 1 according to the invention, comprising a roller core 3 made of an essentially rigid material, such as steel, and an elastomeric coating 2, made in this case of a synthetic rubber material. An adhesive layer (not shown) is provided between roller core 3 and roller coating 2. Roller coating 2 with layer thickness d=10 mm and a hardness of approximately 25 Shore A was applied to the roller core in a single process step.

According to the preferred embodiment, the roller coating, which can be used particularly in the inking unit and damping unit of a printing unit, contains the following constituents:

| | |
|---|---|
| Nitrile rubber (50 Mooney, 33% by weight acrylonitrile) | 100 p.b.w. |
| Zinc oxide | 5 p.b.w. |
| Stearic acid | 1 p.b.w. |
| Filler (FEF black) | 20 p.b.w. |
| Plasticiser (dioctyl phthalate) | 70 p.b.w. |
| Cross-linking agent (sulphur) | 3 p.b.w. |
| Vulcanisation accelerator (mercaptobenzothiazole) | 1.5 p.b.w. |

Of course, other suitable compounds and other suitable agents can also be used instead of the processing agents, fillers, plasticisers, cross-linking agents and vulcanisation agents specified above.

The components of the roller coating are mixed in a standard mixer, calendered and applied in a winding process to the roller core, which has been prepared with a bonding agent. This is followed by standard vulcanisation, such as in an autoclave for four hours at 150° C. Then, standard machining processes, such as grinding, are used to give the single-layer roller with homogeneous roller coating the required dimensions.

In order to surface-harden the roller, a peroxide (such as t-butylperoxybenzoate) is applied evenly to the surface of the roller in a suitable concentration, such as 50 to 40 ml/m$^2$, preferably 100 to 300 ml/m$^2$, particularly about 250 ml/m$^2$, where the roller can rotate at a suitable speed. The liquid peroxide is subsequently allowed to diffuse into the elastomer coating for a period of time that is sufficient to achieve the desired hardness gradient, i.e. for about 5 minutes to 2 hours, e.g. about 30 minutes. Immediately after this diffusion time, the elastomer coating is heated by a heating unit to a sufficient reaction temperature at which the peroxide reacts with the rubber component and hardens it, and held at this temperature for a sufficient reaction time, such as about 1 hour.

The depth profile of the hardness (Shore A hardness) of a roller produced in this way is shown in schematic form in FIG. 2. The roller coating displays a section of layer thickness $d_V$ with an essentially continuous hardness gradient, where the harder section is immediately adjacent to the outer circumference of the roller coating. Here, the hardness gradient is essentially exponential. In this context, the outermost layer of the roller coating has an intrinsic hardness. of about 85 Shore A. Through a radial depth of approximately 1 mm, the hardness drops to that of the unmodified roller coating, or about 25 Shore A in this case. Thus, core 3 is surrounded by layers A and B of different hardness, where second layer B surrounding first layer A is of greater hardness. Consequently, a hardness gradient of about 0.6 Shore A/10 micrometers exists through the surface-hardened layer of layer thickness $d_V$. The measured surface hardness of the roller, at which the influence of the hardness gradient becomes evident, is in the region of 47 Shore A. The hardness from the surface-hardened layer to the roller core is essentially constant.

Alternatively, the surface of the elastomeric coating of the roller can also be hardened by applying a sulphur monochloride solution of suitable concentration, such as about 2.5% by weight, in a suitable solvent, such as diethyl ether, to the roller coating, which can have the composition described above, for example, and tempering it over a sufficient period of time at a sufficient temperature (e.g. 80° C./30 minutes). Relatively thin layers in the region of 0.1 to 0.5 mm, e.g. about 0.2 mm, can be produced in this way. According to another alternative, the surface of a roller coating can be hardened by rubbing a mixture of vulcanisation agent and vulcanisation accelerator (e.g. a mixture of sulphur and diphenylguanidine) in a suitable mixing ratio (e.g. a mixing ratio of 3:1) into the surface of the roller to be modified in a roller nip for a suitable period of time of 5 minutes to 2 hours, for example, preferably about 30 minutes. Tempering is then carried out at a sufficient temperature and for a sufficient period of time (e.g. about 1 hour at 150° C.). Of course, the hardeners specified above can also be incorporated into the roller coating by other mechanical methods.

Under certain circumstances, room temperature can be sufficient for diffusing the hardness-modifying substances specified above into the roller coating, where an elevated process temperature accelerates incorporation. The diffusion process can be supported by suitable agents, e.g. suitable solvents, such as acetone or the like. The surface-hardening agent can be applied to the roller surface together with an agent that optimises the wetting characteristics, particularly a hydrophilising or oleophilising agent, e.g. a hydrophilising fatty alcohol derivative, such as a fatty alcohol polyglycol ether, or an oleophilising oligomeric liquid EPDM, in order to be able to modify the wetting capacity of the roller surface during hardness modification or in a subsequent process step, e.g. to improve its wettability by water. The wetting agent is preferably applied to the roller coating at a time when it can still be radically bound to the surface-hardening cross-linking agent, such as the peroxide, on the elastomer surface.

FIG. 3 shows a modification of a depth profile of the roller according to FIGS. 1 and 2, where the near-surface layer with the greatest hardness is provided at a distance of approximately 5 micrometers from the roller surface, and the decline in hardness towards the roller surface makes up about 5% of the absolute hardness of the hardest layer, this being due, for example, to the surface decomposition or secondary reaction of the cross-linking agent applied for the purpose of hardening. Starting at the hardest layer SH, the hardness declines continuously down to a coating layer depth of approximately 100 micrometers. Layer SH displays the greatest hardness down to a coating depth of 10 mm, preferably through the entire thickness of the layer. The descriptions for FIGS. 1 and 2 apply in all other respects.

FIG. 4 shows a modification of roller 1 according to the invention comprising roller core 3, where the identical components are given the identical reference numbers. The hardness curves of the coatings are shown in FIGS. 5 and 6. Roller coating 2 with layer thickness d=10 mm and a hardness of about 25 Shore A corresponds to the coating in the preferred embodiment in FIGS. 1 to 3. In contrast to FIGS. 1 and 2, the inside surface of the coating is hardened and layer thickness d=0 corresponds in FIG. 4 to the inside coating surface, which is modified in this case. According to the modification, the roller coating was prefabricated in the manner of a tube, the inside surface of the coating facing core 3 was surface-hardened as in FIGS. 1 to 3 and slipped over the roller core prepared with a bonding agent. The production of the hardness gradient according to FIG. 5 corresponds to the explanation for FIG. 2, while that of FIG. 6 corresponds to the explanation for FIG. 3. By modifying the inside coating surface, the coating can be adapted, particularly with regard to bonding with the core, particularly in consideration of the necessary heat dissipation towards the core and the mechanical stability of the inside coating surface, and, in the case of thin roller coatings, also with regard to the properties of the outer coating surface, which, presupposing suitable selection of the coating parameters and under suitable conditions, can improve the quality of fluid preparation or application and thus also that of the printed products.

In all preferred embodiments, the hardness gradient according to the invention is thus produced by microscopically homogeneous distribution in the roller coating of a substance or agent, other than fillers or fibres.

Roller for Fluid Film Preparation or Application

| List of reference numbers | |
|---|---|
| 1 | Roller |
| 2 | Coating |
| 3 | Core |
| $d_v$ | Layer thickness |
| A | First layer |
| B | Second layer |

What is claimed is:

1. Roller for fluid film preparation, having an inside core and a roller coating of layer thickness d, comprising a first layer, which surrounds the core and has a first hardness, and a second layer, which surrounds the first layer and has a second hardness different from that of the first layer, wherein the roller coating at least in certain areas displays an essentially continuous hardness gradient through at least part of layer thickness d, wherein the hardness gradient extends essentially linearly or exponentially over a layer thickness of more than 0.1 mm and over a range of effective hardness of more than 5 Shore A, and wherein a layer having the highest hardness, from which the hardness decreases essentially continuously towards the core is arranged within a section starting from the roller surface and extending to a depth of 20 micrometers or less.

2. Roller according to claim 1, characterised in that one or more of the components producing a hardness gradient is/are selected from the group of fillers, hardeners, cross-linking agents, activators, photoinitiators, monomers and oligomers of a polymeric material, and plasticisers.

3. Roller according to claim 2, characterised in that the cross-linking agent consists of one or more components selected from the group of peroxide, sulphur, halide, sulphur halides and polysulphur dihalides.

4. Roller according to claim 1, characterised in that the hardness gradient is produced by the gradient of a hardness-modifying substance or agent, which is incorporated into the coating material by means of diffusion or migration of the substance or agent, or a precursor thereof, from at least one surface of the roller coating.

5. Roller according to claim 4, characterised in that the hardness-modifying substance is a thermally activatable cross-linking agent, and that the roller is produced by superficial application of the cross-linking agent on a roller coating material made of a cross-linkable elastomer, diffusion of the cross-linking agent into the elastomer with generation of a cross-linking agent gradient, and cross-linking of the elastomer with generation of a hardness gradient.

6. Roller according to claim 1, characterised in that the basic coating material of the roller coating applied to the core has a hardness of less than 35 Shore A.

7. Roller according to claim 1, characterised in that the surface of the roller coating is provided with an additional layer of immobilised, surface-modifying agent.

8. Roller according to claim 1, characterised in that a layer having the greatest hardness of the layer thickness section with an essentially continuous hardness gradient is located on, or adjacent to, the outer surface of the roller coating.

9. Method for manufacturing a roller for fluid film preparation having an inside core and a roller coating comprising a first layer, which surrounds the core and has a first hardness, and a second layer, which surrounds the first layer and has a second hardness different from that of the first layer, where the first and the second layer together have a layer thickness d and are from the same base material, wherein an essentially continuous hardness gradient is produced at least in certain areas in the roller coating, wherein a hardness-modifying substance or agent is incorporated into the coating material made of the base material by means of diffusion or migration of the substance or agent or a precursor thereof from a surface being the surface of the roller coating or of the layer made of the base material, penetrating the layer of the base material to produce the hardness gradient so that the hardness gradient extends essentially linearly or exponentially over a layer thickness of lore than 0.01 mm and over a range of effective hardness of more than 5 Shore A from the surface.

10. Method according to claim 9, characterised in that one or more of the components producing a hardness gradient is/are selected from the group of fillers, hardeners, cross-linking agents, monomers and oligomers of a polymeric material, and plasticisers.

11. Roller according to claim 9, characterised in that the hardness modifying substance is a thermally activatable cross-linking agent, and that the roller is produced by superficial application of the cross-linking agent on a roller coating material made of a cross-linkable elastomer, diffusion of the cross-linking agent into the elastomer with generation of a cross-linking agent gradient, and cross-linking of the elastomer with generation of a hardness gradient.

12. Method according to claim 9, characterised in that, in order to produce the hardness gradient, the process step that produces the hardness gradient is interrupted before a change in hardness occurs through the entire layer thickness of the coating material.

13. Method according to claim 9, characterised in that a hardness gradient of the roller coating is produced such that the near-surface layer with the greatest hardness, from where the hardness declines essentially continuously towards the inside, lies in a section starting from the roller surface and extending to a depth of approximately 100 micrometers.

14. Method according to claim 9, characterised in that an essentially continuous hardness gradient is produced in a functional roller (1) with a homogeneous roller coating (2) by means of chemical and, if necessary, subsequent thermal treatment.

15. Roller for fluid film preparation, having an inside core and a roller coating of layer thickness d, comprising a first layer, which surrounds the core and has a first hardness, and a second layer, which surrounds the first layer and has a second hardness different from that of the first layer, wherein the roller coating at least in certain areas displays an essentially continuous hardness gradient through at least part of layer thickness d, wherein the hardness gradient extends essentially linearly or exponentially over a layer thickness of more than 0.1 mm and over a range of effective hardness of more than 5 Shore A, and wherein the first and the second layer are made from the same base material.

16. Roller for fluid film preparation, having an inside core and a roller coating of layer thickness d, comprising a first layer, which surrounds the core and has a first hardness, and a second layer, which surrounds the first layer and has a second hardness different from that of the first layer, wherein the roller coating at least in certain areas displays an essentially continuous hardness gradient through at least part of layer thickness d, wherein the hardness gradient extends essentially linearly or exponentially over a layer thickness of more than 0.1 mm and over a range of effective hardness of more than 5 Shore A, wherein the first and the second layer are made from the same base material, wherein a layer having the highest hardness from which the hardness decreases essentially continuously towards the core is arranged at the outer surface of the layer made from the base material, and wherein, optionally, the surface of the roller coating is provided with an additional cover layer.

17. Method for manufacturing a roller for fluid film preparation having an inside core and a roller coating comprising a first layer, which surrounds the core and has a first hardness, and a second layer, which surrounds the first layer and has a second hardness different from that of the first layer, where the first and the second layer together have a layer thickness d and are from the same base material, wherein an essentially continuous hardness gradient is produced at least in certain areas in the roller coating, wherein a hardness-modifying substance or agent is incorporated into the coating material made of the base material by means of diffusion or migration of the substance or agent or a precursor thereof from a surface being the surface of the roller coating or of the layer made of the base material, only partially penetrating the layer of the base material to produce the hardness gradient so that the hardness gradient extends essentially linearly or exponentially over a layer thickness of more than 0.01 mm and over a range of effective hardness of more than 5 Shore A from the surface and that a region of the coating made from the same base material radially spaced apart from the surface is unmodified by the hardness-modifying substance or agent.

18. A roller for fluid film preparation comprising:

an inside core; and a roller coating having a layer thickness d, said roller coating having a first layer having a first hardness disposed over said core, and a second layer having a second hardness disposed over said first layer, said first hardness being different from said second hardness;

at least a portion of said first and second layers are defining an essentially continuous hardness gradient therebetween, the first and the second layer and the layer portion between them having an essentially continuous hardness gradient are from the same homogenous base material being a cross-linkable elastomeric material, wherein the portion of said roller coating having an essentially continuous hardness gradient is provided with an essentially continuous gradient of degree of cross-linking of the homogenous elastomeric base material.

19. A method of producing a roller for fluid film preparation comprising:

providing an inside core;

providing a first layer having a first hardness, said first layer disposed around said core; and providing a second layer having a second hardness that is different from said first hardness, said second layer disposed around said first layer and at least a portion of said first and second layers defining an essentially continuous hardness gradient therebetween, whereby the first and the second layer and the layer portion between them having an essentially continuous hardness gradient are from the same homogeneous base material being a cross-linkable elastomeric material, wherein a cross-linking agent is incorporated into the homogeneous elastomeric base material with a gradient and the base material is cross-linked by means of the cross-linking agent to generate an essentially continuous gradient of degree of cross-linking of the homogeneous elastomeric base material and to provide the essentially continuous hardness gradient of at least a portion of said roller coating;

at least a portion of said first and second layers defining an essentially continuous hardness gradient therebetween.

* * * * *